Figure 2:
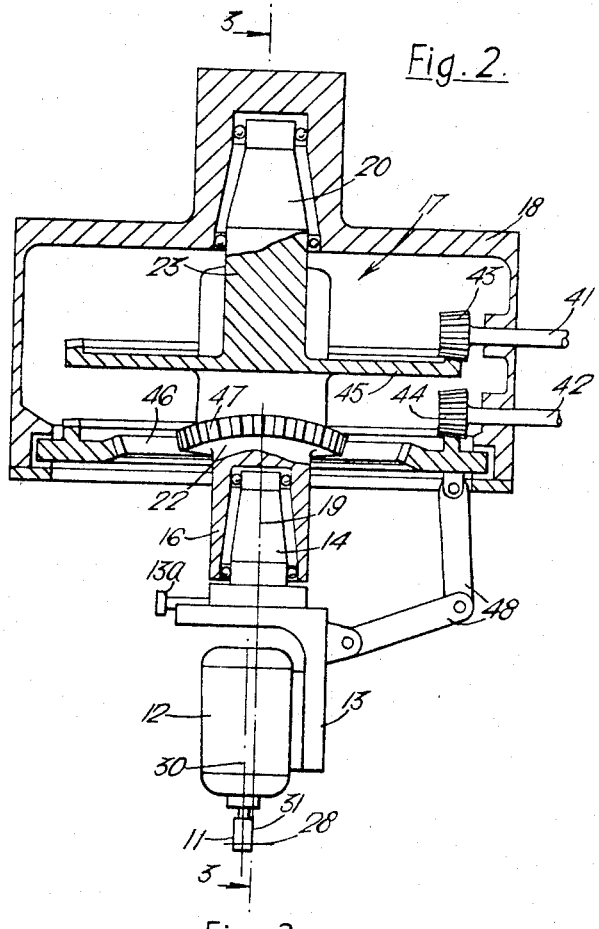

Oct. 4, 1966  J. ARROWSMITH ET AL  3,276,327
MACHINE TOOLS
Filed April 27, 1964
6 Sheets-Sheet 1
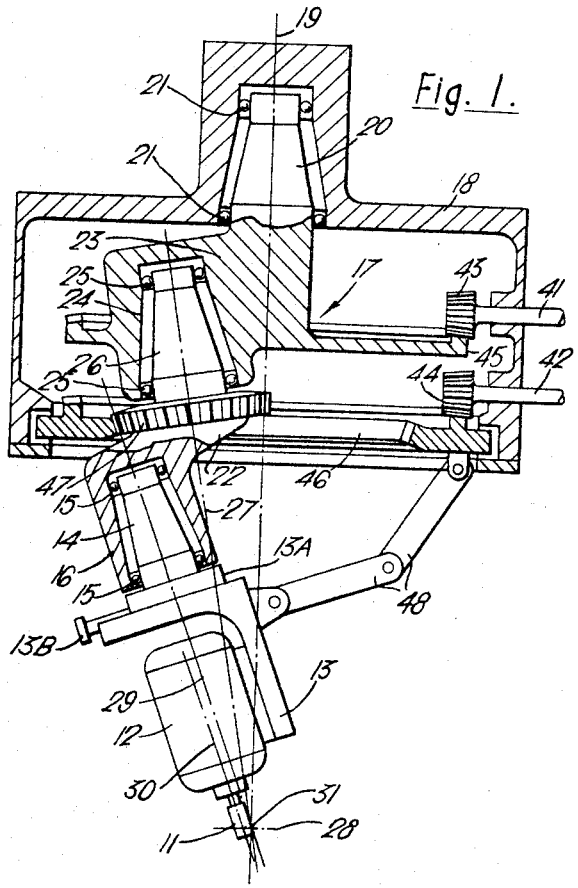
Fig. 1.
Fig. 1a.
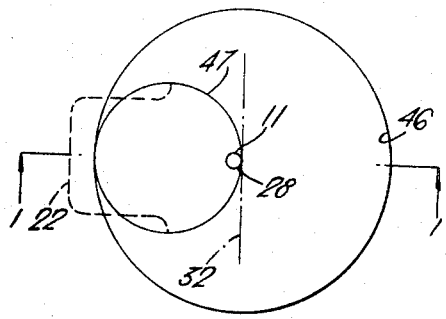
Inventors
James Arrowsmith
Ronald Frederick States
By
Dowell & Dowell
Attorneys Inventors
James Arrowsmith
Ronald Frederick States
By Dowell Dowell
Attorneys

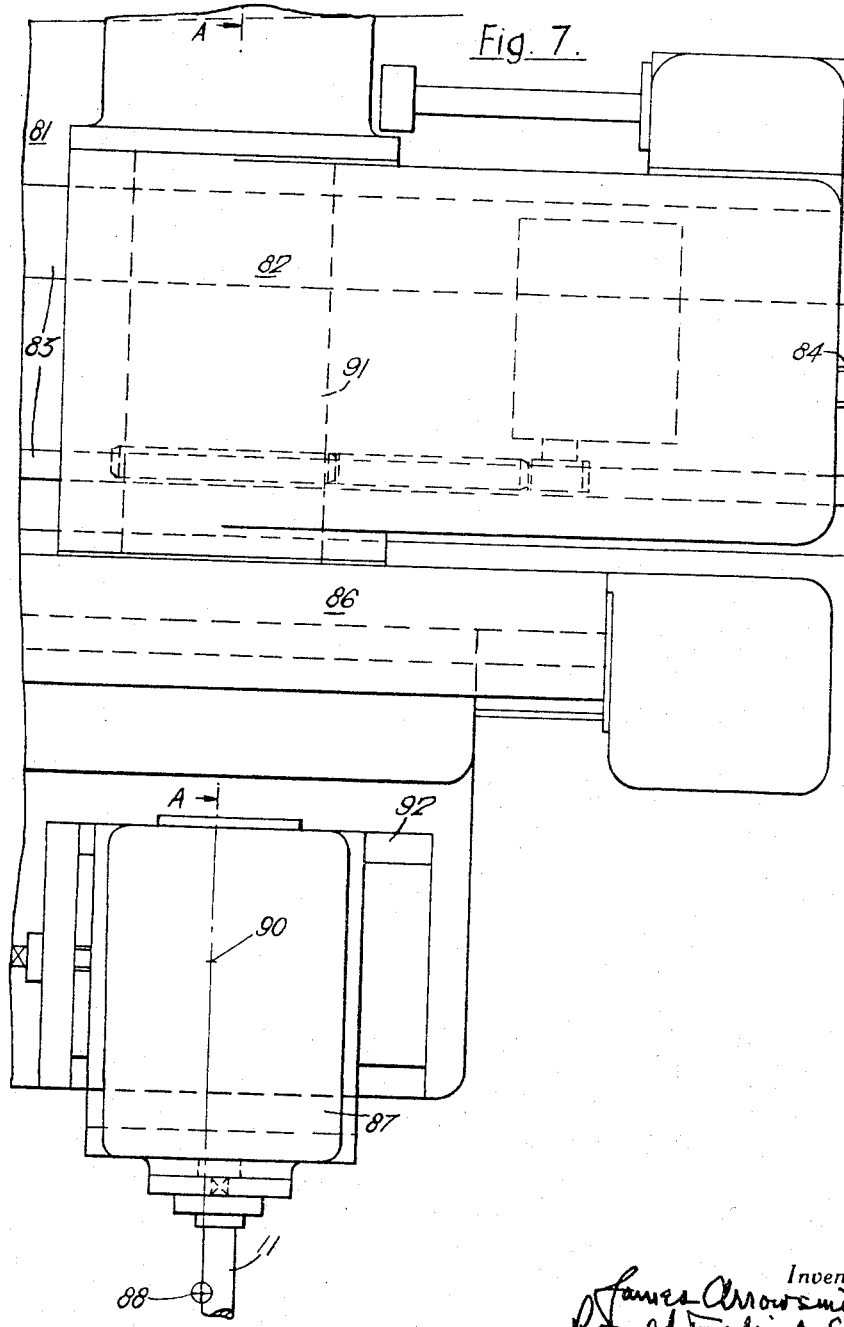

United States Patent Office 3,276,327
Patented Oct. 4, 1966

3,276,327
MACHINE TOOLS
James Arrowsmith, Oldham, and Ronald Frederick States, Welwyn Garden City, England, assignors to Hawker Siddeley Aviation Limited, London, England
Filed Apr. 27, 1964, Ser. No. 362,814
Claims priority, application Great Britain, Apr. 29, 1963, 16,768/63
14 Claims. (Cl. 90—13)

This invention relates to programme-controlled machine tools, in particular milling machines in which the relative movement of the workpiece and the cutter is controlled, generally along two axes, by means of servo-motors which in turn receive their instructions by some form of programming. In the most common case the programme is made up on a magnetic tape which has been prepared on a computer, or the programme may be on a punched tape in which case usually the machine control console itself incorporates a computer stage.

It is an object of the invention to overcome certain disadvantages which are common to most such machines.

One difficulty is connected with the machining of surfaces whose inclination varies in planes at right angles to the plane in which work-table movements occur. An instance is the milling of a spar of an aeroplane wing. These spars are often milled on a machine capable of copying from a template and it is possible in some machines not only to vary coordinates in the plane (generally horizontal) of the work table according to the shape of the template, but also to vary the inclination of the cutter to the vertical. The problem is how to provide for variable cutter inclination in an automatic programme-controlled machine without unduly complicating the nature of the programming.

Another difficulty resides in the fact that cutters may differ in diameter from one another and also each individual cutter changes in diameter during its life by decreasing in size at each resharpening. This means that if the vertical datum of the tool, to which the control instructions are referenced, is taken to be the axis of the cutter and its drive motor, as is common, the work-table coordinates or other control instructions to the machine must vary appropriately with varying cutter diameter or error will be introduced into the actual cut. The problem here, therefore, is how to allow for variations in cutter size on a particular job without change in the control programme.

According to the present invention, there is provided a milling machine wherein the mutual arrangement of the cutter and work-table is such that, during any one machining operation, the axis of the cutter, considered at zero inclination, maintains a constant offset with respect to the cutter datum line to which the control programme is referenced, the datum line being represented by a line perpendicular to the plane of relative movement of the cutter and work-table and passing through the point where the cutter is actually operating on the work, and the cutter mounting is such as to enable the cutter to tilt about an axis that intersects said datum line either at the cutting point or at a point displaced therefrom. In the latter case there may be means for automatically deriving a cutter position correction signal to be injected into the servo control of the relative position of the cutter and work-table.

Considering the case in which the control instructions are in the form of changing rectangular coordinates continually repositioning the work-table in the horizontal plane in relation to the cutter, the tilt axis may be actually coincident with the horizontal tangent to the point of cutting. Thus the tilt axis and vertical datum line always intersect and substantially no error in the cut is introduced by changes in the tilt angle.

In this particular instance one possible arrangement comprises the provision of a cutter carrier mounted for angular movement relative to a first member that is itself able to move angularly relatively to a second member which in its turn is mounted for rotation about the vertical datum line; the axis of movement of the first member with respect to the second member is inclined at a preselected angle to the datum or axis of rotation of the second member, the axis of movement of the cutter carrier on the first member is inclined at that same angle to the axis of movement of the first member on the second, and all three axes intersect at the point of cutting; and the axis of the cutter tool is parallel to the axis of movement of the cutter carrier on the first member and is offset therefrom by an amount appropriate to the diameter of the cutter. This gives an assembly in which the cutter can be tilted from zero inclination to an angle of inclination to the vertical equal to twice the aforesaid preselected angle, and also enables the cutter assembly to be turned as necessary to keep the plane containing the cutter axis and vertical datum always substantially at right angles to the aforesaid horizontal tangent.

Figure 2A:
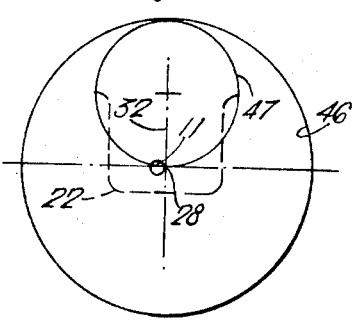
Figure 3:
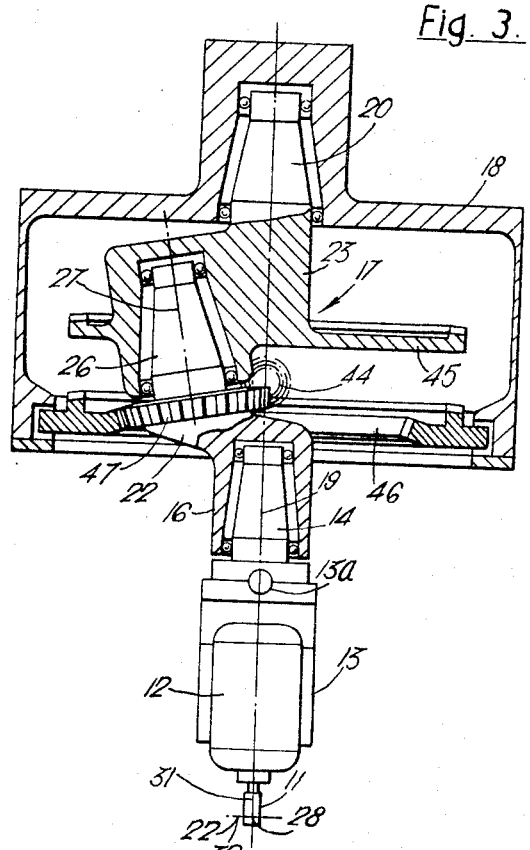
Figure 4:
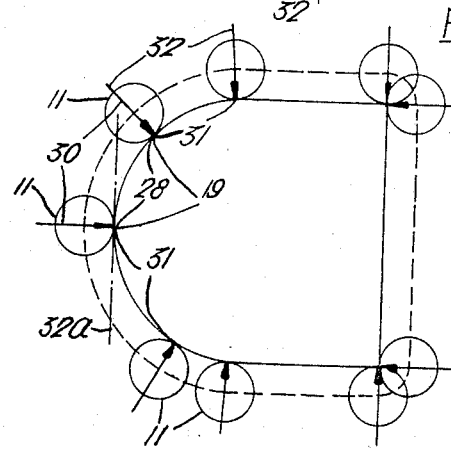
Figure 5:
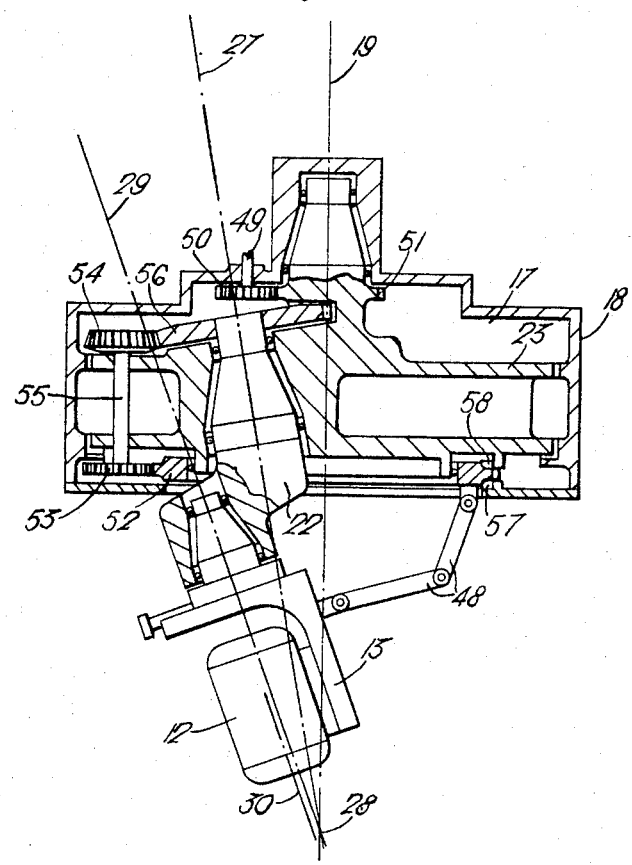
Figure 6:
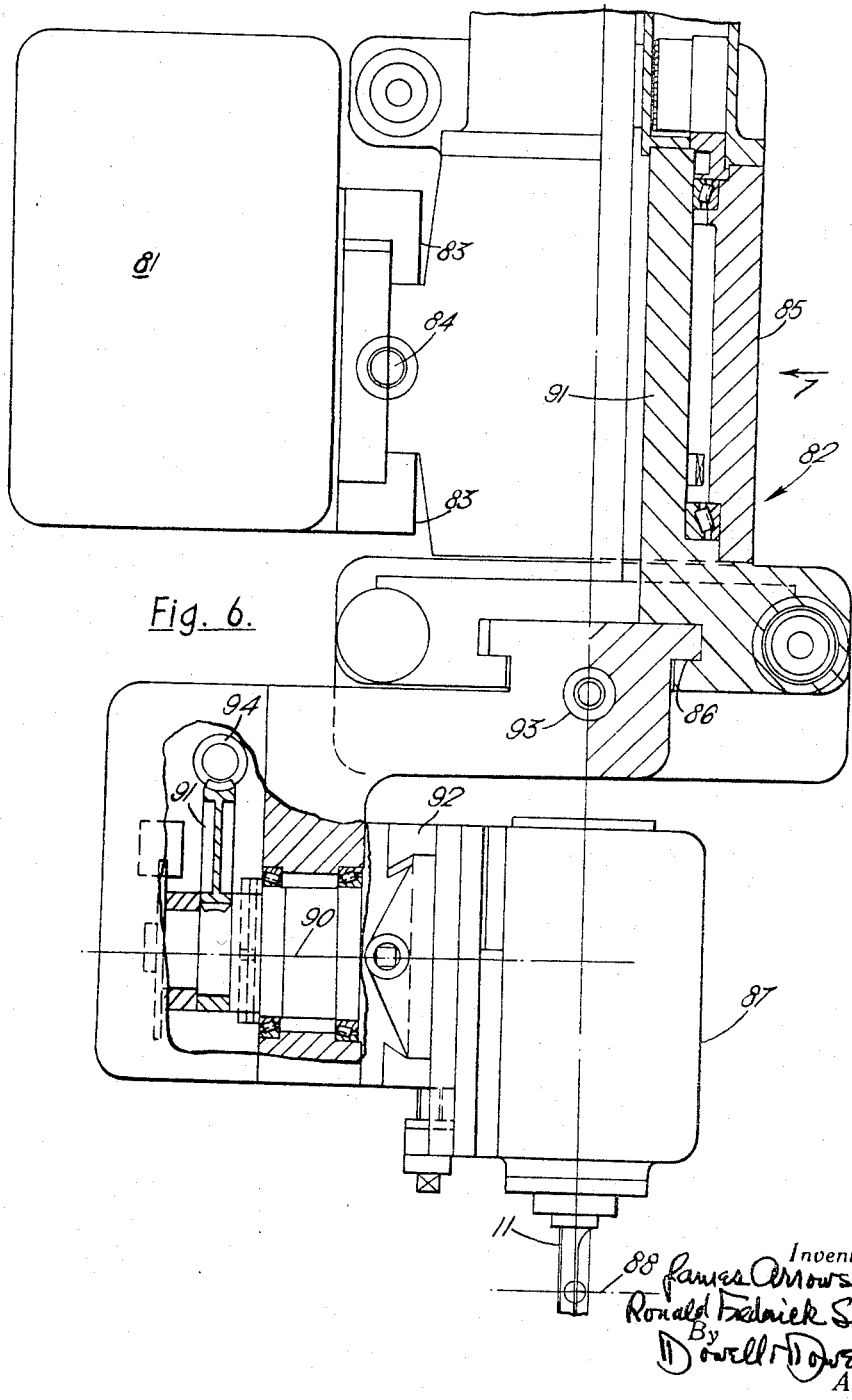

Embodiments of the invention operating according to the foregoing principles will now be described by way of example, reference being had to the accompanying drawings in which:

FIGURE 1 is an elevation of a milling cutter mounting assembly in section on the line 1—1 of FIGURE 1a, FIGURE 1a is a diagrammatic plan of the mounting assembly of FIGURE 1, FIGURE 2 shows the assembly of FIGURE 1 with certain of the parts rotated through 90°, FIGURE 2a is a further diagrammatic plan of the assembly with the parts in the position of FIGURE 2, FIGURE 3 is a view in section on the line 3—3 of FIGURE 2, FIGURE 4 is a diagram illustrating the progress of the cutter around the edge of a workpiece, FIGURE 5 is an elevation, in section, of a modified form of the cutter mounting assembly, FIGURE 6 is an elevation, partly in section, of a further milling cutter mounting arrangement, and FIGURE 7 is a view in the direction of the arrow 7 of FIGURE 6.

FIGURES 1 to 4 of the accompanying drawings illustrate the invention as applied to a milling machine of the type in which there are two servo systems for moving the workpiece relatively to the cutter in two horizontal directions at right angles so as to maintain the relative position in accordance with changing rectangular coordinates that constitute the control programme. The drawings show the cutter mounting assembly of the machine.

The cutter 11 and cutter motor 12 are mounted on a carrier bracket 13 that has an upwardly projecting spigot 14 received in ball-bearings 15 in the bottom end 16 of the lower part 22 of two-part cranked rotor 17. The rotor 17 is carried by a case 18 that houses all except the bottom end of it; it is the vertical axis 19 of the case 18 that is treated as the travelling tool datum in the programming of any machining operation.

The upper part 23 of the two-part rotor 17 has a top spigot 20 that is coaxial with the case 18 and is received in bearings 21 of the case. Below the spigot 20 the upper part of the rotor is cranked and it has a downwardly opening bearing recess 24 containing bearings 25 that receive a spigot 26 forming the top end of the lower part 22 of the rotor. The spigot 26 and bearings 25 are offset laterally with respect to the vertical axis or datum line 19 of the case 18, and furthermore the axis 27 of the spigot and bearing assembly 26, 25 is out of the vertical, the axes 19, 27 being at an acute angle θ to one another and intersecting at a point 28.

The lower part 22 of the motor 17 is also cranked, so that the axis 29 of the tool carrier spigot 14 and the bearings 15 has the same relationship to the axis 27 as the axis 27 has to the vertical datum axis 19. That is to say, the axes 29, 27 make an angle θ with one another and intersect at the point 28. It will thus be seen that if the two parts 22, 23 of the cranked rotor 17 are relatively rotated the axis 29 is tilted a progressively varying amount, the range of tilt being from a vertical position of zero tilt (FIGURE 3) in which the axes 29 and 19 are coincident to a maximum tilt of 20 from the vertical (FIGURE 1). Also if the two parts of the rotor 17 are rotated simultaneously in opposite directions the tilt can be made to occur in one vertical plane.

The cutter 11 and cutter motor 12 are mounted with their common axis 30 parallel to and offset from the axis 29 by an amount such as to bring the cutting edge 31 of the cutter into precise alignment with the axis 29. That is, the offset is equal to the cutter radius at the cutting edge. Furhermore, the horizontal cutting datum 32 intersects the point 28, or in other words the aforementioned tilt takes place about the horizontal cutting datum. Consequently, tilting the cutter introduces no error in cutting depth.

It will be noted that, providing the plane containing the vertical datum and the cutter axis 30 is maintained at right angles to the horizontal tangent 30a to the cut profile at the point of cutting, as illustrated diagrammatically in FIGURE 4, the cutting edge 31 is coincident with the vertical datum 19 at zero tilt and the point of cutting is always on the datum. Therefore the control programme can be referenced to the datum line 19 regardless of cutter diameter. An adjusting screw 13a is provided for lateral adjustment of the cutter and cutter motor on the carrier bracket 13 so that the spacing distance of the cutter axis 30 and the axis 29 can be changed to suit different cutter diameters.

There are a number of ways in which the machine control can be coupled to bring about the relative rotations of the various parts of the assembly. In the arrangement illustrated in FIGURES 1 to 3 there are two horizontal control input shafts 41, 42 journalled in the side of the case 18 and each having a pinion 43, 44 within the case. The pinion 43 on the input shaft 41 meshes with a gear 45 that is integral with the upper part 23 of the rotor 17 and centred upon the datum axis 19. The pinion 44 on the input shaft 42 meshes with a ring gear 46 mounted for rotation in the case about the datum axis 19 and having internal teeth that engage a further gear 47 integral with the lower part 22 of the rotor 17 and centred upon the axis 28. The cutter carrier bracket 13 is constrained against rotation relative to the ring gear 46 by torque links 48.

By the application of appropriate control inputs to the two input shafts 41, 42 any desired tilting of the cutter or orientation of the cutter about the datum axis, or combination of these motions, can be achieved.

FIGURE 5 shows a possible alternative in which the motions of the cutter are controlled by a single input shaft 49. The shaft 49 is journalled in the top of the case 18 and carries a pinion 50 in mesh with a gear 51 integral with the upper part of the rotor 17. A ring gear 52 mounted for rotation about the datum axis 19 in the lower part of the case, and connected by torque links with the cutter carrier bracket, meshes with a planet gear 53. The planet gear 53 is carried, along with a bevel gear 54, on a vertical shaft 55 journalled in the upper part of the rotor 17, and the bevel gear 54 is in mesh with a gear 56 on the lower part of the rotor centred on the axis 27. A brake 57 is provided on the case to engage the ring gear 52, and there is also a clutch 58 for coupling the ring gear to the upper part 23 of the rotor 17.

To tilt the cutter, the brake 57 is engaged and the clutch 58 disengaged. Rotation of the input shaft 49 then causes the upper part 23 of the rotor 17 to carry the planet gear 53 around the ring gear 52 and thereby cause rotation simultaneously of the lower part 22 of the rotor in the opposite direction through the gears 54, 56. The gear ratios are chosen so that the tilt of the axis 29 will take place in one vertical plane.

To orientate the cutter about the datum axis 19, the brake 57 is disengaged and the clutch 58 engaged. Now rotation of the upper part 23 of the rotor by the input shaft 49 will carry the whole assembly around the datum axis.

If desired, tilting and orientation of the cutter can be obtained simultaneously by replacing the brake and clutch with further gearing.

An alternative cutter mounting arrangement is shown in FIGURES 6 and 7. A horizontal beam 81 constitutes a fixed structural member located some distance above the machine base on which the work-table moves in a horizontal direction at right angles to the beam 81. The milling head assembly 82 moves horizontally on parallel slides 83 attached to the beam 81, a servo system driving the head assembly by means of a recirculating ball lead screw 84. The milling head assembly comprises a pivot housing 85, a secondary horizontal slide 86 and a router motor 87 capable of tilting about a horizontal axis 90 at right angles to the slide 86. The whole assembly of router motor, cutter, tilting mechanism and secondary horizontal slide 86 is carried from the pivot housing 85 by means of a pintle 91, forming an upward extension of the slide 86, and located in the pivot housing by means of two taper roller bearings.

As in the case of the cutter head of FIGURES 1 to 4a, the rotating assembly is driven by a servo-mechanism which in turn receives electrical signals from the programme such that the plane containing the centre line of the cutter and the chosen cutting edge, as well as the longitudinal axis of the secondary horizontal slide 86, is always aligned at right angles to the horizontal tangent to the profile being cut at any instant. In the arrangement as shown in FIGURES 6 and 7 adjustment to allow for varying cutter diameters may be made manually by setting a small machine slide immediately adjacent to the router motor. However this is merely a refinement as this adjustment can well be made at machine slide 86.

The main intention of slide 86 is to provide for compensation in case it is desired to tilt the cutter. In the arrangement shown the vertical distance between the cutter tilt axis 88 and the axis of the horizontal pivot 90 is equal to twice the radius of a gear segment 91 attached to the horizontal pivot 90 and mating with a tilt drive screw 94. Consequently if the tilt drive screw 94 and the recirculating ball lead screw 93 in slide 86 are of equal pitch, and these two screws are geared together at a ratio of 2:1, turning of the screws will result in the router motor pivoting and simultaneously moving laterally along the slide 86 by the amount required to maintain the tilt axis 88 in a fixed relationship to the centre line of the main pivot housing 85.

It will also be seen that by momentarily declutching the tilt drive screw and turning only the recirculating ball lead screw in slide 86, adjustment to compensate for varying cutter diameters can be made. Thus the provision of the additional horizontal slide 92 as shown is optional.

In operation the machine shown in FIGURES 6 and 7 thus produces the same result as the arrangement shown in FIGURES 1 to 4.

Since the foregoing techniques are clearly applicable to any machine tool where a cutter or its equivalent is required to perform motions having the same characteristic as those of a milling cutter, the term "milling machine"

as used in the appended claims is to be read as generic to all such machine tools.

We claim:

1. A programme-controlled milling machine wherein the mutual arrangement of the cutter and work-table is such that, during any one machining operation, the axis of the cutter, considered at zero inclination, maintains a constant offset with respect to the cutter datum line to which the control programme is referenced, the datum line being represented by a normally vertical line perpendicular to the plane of relative movement of the cutter and work-table and passing through the point where the cutter is actually operating on the work, and the cutter mounting is such as to enable the cutter to tilt about an axis that intersects said datum line and is coincident with the horizontal tangent to the point of cutting, said cutter mounting comprising a first rotor member, a second rotor member and a cutter-carrier mounted on said first rotor member for angular movement relatively thereto, said first rotor member being itself mounted to move angularly relatively to said second rotor member, and said second rotor member being mounted for rotation about said vertical datum line.

2. A milling machine according to claim 1, wherein the axis of movement of said first rotor member with respect to said second rotor member is inclined at a preselected angle to the datum or axis of rotation of said second rotor member, the axis of movement of the cutter carrier on the first rotor member is inclined at the same angle to the axis of movement of the first rotor member on the second, and all three axes intersect at the point of cutting.

3. A milling machine according to claim 2, wherein the axis of the cutter tool is parallel to the axis of movement of the cutter carrier on the first rotor member and is offset therefrom by an amount appropriate to the diameter of the cutter.

4. A milling machine according to claim 3, wherein operative connections are provided whereby said first and second rotor members are angularly moveable independently by separate control input shafts.

5. A milling machine according to claim 4, wherein the operative connections are arranged so that one input shaft determines the orientation of the cutter about the datum axis, while the other input shaft sets the tilt of the cutter by simultaneous angular movement of said first and second rotor members in opposite directions at the same speed.

6. A milling machine according to claim 5, wherein one input shaft is geared to the second rotor member, while the second is geared to the first rotor member through a ring gear that is coaxial with the vertical datum line, and the cutter carrier is held against rotation relative to the ring gear.

7. A milling machine according to claim 1 wherein the first and second rotor members and the cutter carrier are operatively connected by drive means such that a single input shaft controls both orientation of the cutter about the datum axis and the tilt of the cutter.

8. A milling machine according to claim 7, wherein the arrangement includes a clutch and a brake, the brake serving to hold the cutter carrier against rotation whereupon operation of the control input shaft causes rotation of the first and second rotor members in opposite directions and by equal amounts to control the tilt of the cutter, and the clutch serving to couple the cutter carrier for rotation with the second rotor member whereby engagement of the clutch and release of the brake enables the control input shaft to turn the two rotor members and the cutter carrier as one to change the orientation of the cutter.

9. A milling machine according to claim 8, wherein the control input shaft is geared to the second rotor member, and the first rotor member is geared to the cutter carrier, the gearing in the latter case including a ring gear which rotates with the cutter carrier and is coaxial with the vertical datum line, and the brake and clutch act on said ring gear.

10. A milling machine according to claim 9, wherein the cutter is mounted on a slide on the cutter carrier that is adjustable to vary the distance between the cutter axis and the axis of rotation of the cutter carrier.

11. A programme-controlled milling machine wherein the mutual arrangement of the cutter and work-table is such that, during any one machining operation, the axis of the cutter, considered at zero inclination, maintains a constant offset with respect to the cutter datum line to which the control programme is referenced, the datum line being represented by a normally vertical line perpendicular to the plane of relative movement of the cutter and work-table and passing through the point where the cutter is actually operating on the work, and the cutter mounting is such as to enable the cutter to tilt about an axis that intersects said datum line, said cutter mounting comprising a horizontal traverse slide, a cutter assembly mounted on said slide and rotatable relatively thereto about a vertical axis, and a servo mechanism automatically rotating said cutter assembly during cutting to keep the plane containing the centre line of the cutter and the chosen cutting edge at right angles to the horizontal tangent to the profile being cut at any instant.

12. A milling machine according to claim 11, wherein the cutter assembly comprises a cutter carrier that is slidable, in the direction normal to the aforesaid plane, on a second slide that is mounted for rotation about said vertical axis on the first-mentioned slide, and the cutter itself is tiltable on its carrier about a horizontal axis lying in said plane.

13. A milling machine according to claim 12, and comprising operative connections between the tilting cutter and the second slide whereby when the cutter tilts it is automatically traversed simultaneously on the second slide at a rate such as to keep the point of cutting lying on the aforesaid vertical axis of rotation.

14. A programme-controlled milling machine wherein the mutual arrangement of the cutter and work-table is such that, during any one machining operation, the axis of the cutter, considered at zero inclination, maintains a constant offset with respect to the cutter datum line to which the control programme is referenced, the datum line being represented by a normally vertical line perpendicular to the plane of relative movement of the cutter and work-table and passing through the point where the cutter is actually operating on the work, and the cutter mounting is such as to enable the cutter to tilt about an axis that intersects said datum line, and is coincident with the horizontal tangent to the point of cutting, said cutter mounting comprising a rotor which is in two parts relatively rotatable about an inclined axis, and a cutter carrier mounted on one part of said two part rotor whereby simultaneous rotation of the two parts of the rotor in opposite directions alters the cutter tilt.

References Cited by the Examiner

UNITED STATES PATENTS

| | | | |
|---|---|---|---|
| 2,811,085 | 10/1957 | Burke | 90—13 |
| 2,816,486 | 12/1957 | Kanarr et al. | 90—13 |
| 2,900,586 | 8/1959 | Spencer et al. | 90—13 X |
| 3,084,603 | 4/1963 | Jenkins | 90—13 |

WILLIAM W. DYER, Jr., *Primary Examiner.*

G. A. DOST, *Assistant Examiner.*